(12) United States Patent
Mildner et al.

(10) Patent No.: US 8,870,255 B2
(45) Date of Patent: Oct. 28, 2014

(54) SUPPORT FOR A FUNCTIONAL ELEMENT IN A PAIR OF RAILS WITHIN A PASSENGER COMPARTMENT OF A MOTOR VEHICLE

(71) Applicant: GM Global Technology Operations LLC, Detroit, MI (US)

(72) Inventors: Udo Mildner, Limburg (DE); Lothar Teske, Aschaffenburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/670,955

(22) Filed: Nov. 7, 2012

(65) Prior Publication Data

US 2013/0127199 A1 May 23, 2013

(30) Foreign Application Priority Data

Nov. 10, 2011 (DE) .......................... 10 2011 118 150

(51) Int. Cl.
*B60R 7/04* (2006.01)
*B60R 11/00* (2006.01)

(52) U.S. Cl.
CPC ........... *B60R 7/04* (2013.01); *B60R 2011/0007* (2013.01)
USPC ....................... 296/24.34; 296/37.1; 296/37.8

(58) Field of Classification Search
CPC ........................................................ B60R 7/04
USPC ................ 296/1.09, 24.34, 37.1, 37.8, 37.14, 296/65.13, 65.14; 224/548; 292/10, 16, 33, 292/34, 39, 40, 60, 74, 143, 161, 172, 173; 248/429, 430
See application file for complete search history.

(56) References Cited

U.S. PATENT DOCUMENTS

| 5,865,479 | A * | 2/1999 | Viney .............................. 292/39 |
| 7,258,381 | B2 * | 8/2007 | Sturt et al. ................. 296/24.34 |
| 8,246,097 | B2 * | 8/2012 | Beyer .......................... 296/24.34 |
| 2007/0024061 | A1 * | 2/2007 | Zhang et al. .................... 292/16 |
| 2009/0212586 | A1 | 8/2009 | Blanck et al. |

FOREIGN PATENT DOCUMENTS

| DE | 10208886 A1 | 12/2003 |
| DE | 10236582 A1 | 2/2004 |
| DE | 102008010393 A1 | 8/2009 |
| JP | 2001158300 A | 6/2001 |

* cited by examiner

*Primary Examiner* — Glenn Dayoan
*Assistant Examiner* — Jason S Daniels
(74) *Attorney, Agent, or Firm* — Ingrassia Fisher & Lorenz, P.C.

(57) ABSTRACT

A support for a functional element in the form of a container, an armrest or the like in a pair of rails within a passenger compartment of a motor vehicle is provided. In the case of this support, the two rails encompass guide grooves and axially displaceable, bolt-like guide elements are supported in a housing of the functional element, on the side thereof, which faces the respective rail, and includes projections, which face these rails. A spring acts on the guide element and pretensions the projection thereof against the guide groove. The guide element can be moved by means of an actuator supported in the housing opposite to the force of the spring from the contact position in the guide groove, wherein a lower arm of the guide groove, is arranged horizontally and the displacement axis of the guide element for this guide groove is arranged diagonally to the horizontal.

10 Claims, 4 Drawing Sheets

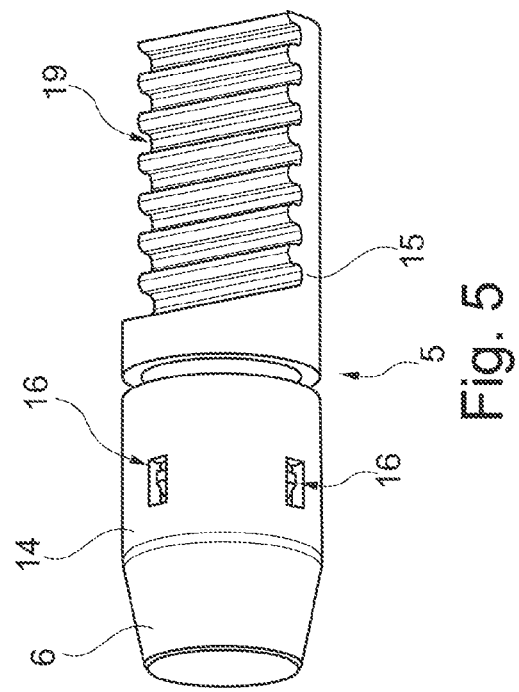
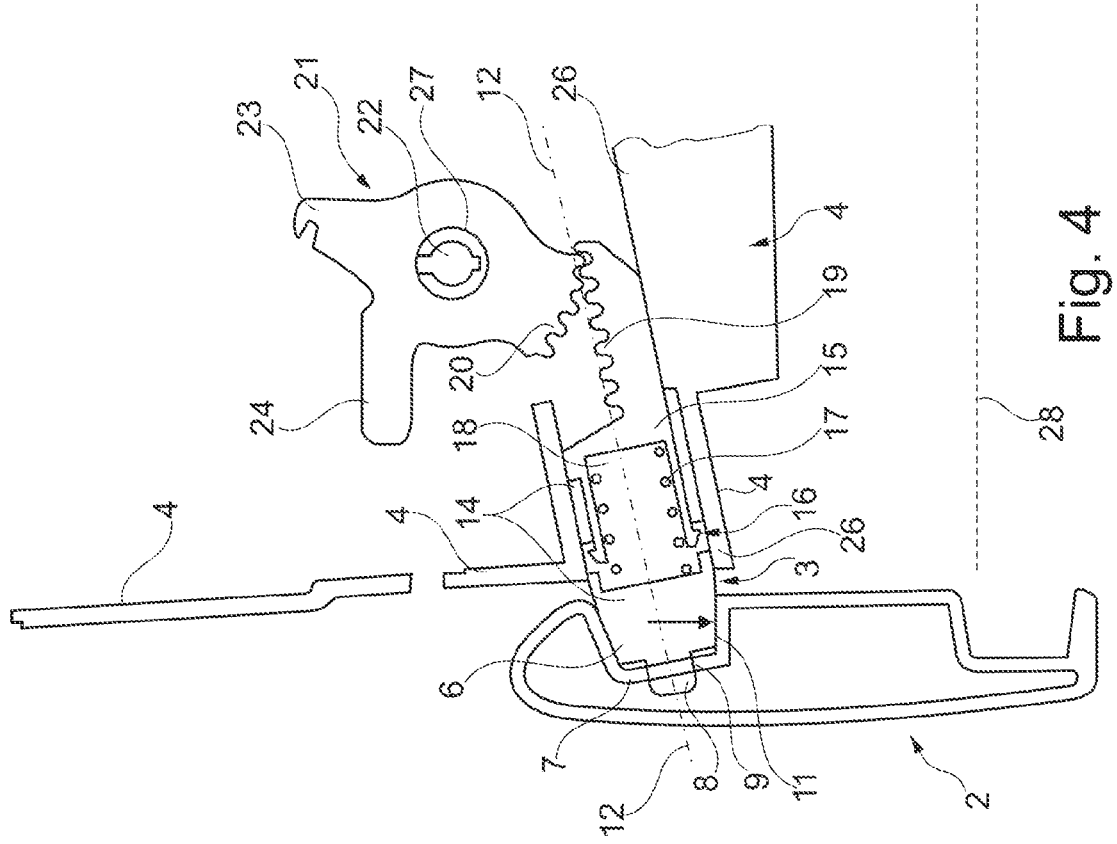

SUPPORT FOR A FUNCTIONAL ELEMENT IN A PAIR OF RAILS WITHIN A PASSENGER COMPARTMENT OF A MOTOR VEHICLE

CROSS-REFERENCE TO RELATED APPLICATION

This application claims priority to German Patent Application No. 10 2011 118 150.8, filed Nov. 10, 2011, which is incorporated herein by reference in its entirety.

TECHNICAL FIELD

This application pertains to a support for a functional element in the form of a container, an armrest or the like in a pair of rails within a passenger compartment of a motor vehicle. In one example, the present disclosure relates to such a support in a passenger vehicle.

BACKGROUND

Motor vehicles are known, in particular passenger vehicles, in the case of which a pair of rails for accommodating a container, an armrest or the like, is arranged in the passenger compartment. The rails, which are arranged parallel to one another, are in one example, arranged between the driver's seat and the front passenger's seat, so that the functional element can be accessed from both seats. After overriding a frictional connection with respect to the two rails, the functional element can be displaced forwards or backwards because of the guide by means of the two rails in the passenger compartment, so that it can be displaced into an ergonomically favorable position to the vehicle passengers of the front seats or so that it can be displaced backwards, from the area between the front seats. In addition, provision can be made for means for locking functional element and rails, so as to be able to position the functional element so as not to be capable of being displaced with respect to the pair of rails. After unlocking these means, the displacement of the functional element is then possible.

The support for a functional element in the form of a container, an armrest or the like in a pair of rails within a passenger compartment of a motor vehicle is known from EP 2 093 107 A1. The two rails of the pair of rails encompass guide grooves on sides, which face one another. Axially displaceable, bolt-like guide elements are supported in a housing of the functional element, on the side thereof, which faces the respective rail. The respective bolt encompasses a projection, which faces the rail assigned to the bolt. The respective guide groove has a cross section, which expands from the groove base. The respective projection encompasses a cross section, which expands accordingly towards the housing of the functional element. A spring acts on the guide element and pretensions the projection thereof against the guide groove. The guide element can be moved from the position, which causes the frictional connection, with respect to the guide groove by means of an actuator, which is supported in the housing, opposite to the force of a spring.

In the case of this known support, the displacement axis of the respective guide element is arranged horizontally, thus vertically to the groove base, so that the upper arm extending from the groove base of the respective guide groove as well as the lower arm extending from the groove base are arranged diagonally to the horizontal. The lower arm of the respective guide groove, which is arranged diagonally to the horizontal, has the effect that the projection of the bolt-like guide element is accordingly arranged in its lower area at a diagonal to the horizontal. Due to this conical shape of the projection and the angle, which differs to the horizontal, forces in axial direction of the bolt-like guide element are introduced into the latter due to the dead weight of the functional element in the form of the container, the armrest or the like, by loading the container, by supporting a passenger of the vehicle on the container, by supporting the armrest, respectively. These forces are effective opposite to the force of the spring, which presses the guide element into the guide groove. These forces can accordingly reduce the frictional forces between guide groove and guide element or can even lead to an unlocking of the respective guide element, respectively, when the guide element is locked with the rail.

To avoid that the frictional connection is overridden or that the unlocking of the system takes place unintentionally by introducing a force in axial direction of the spring, they must be embodied so as to be reinforced. The force for actuating an actuator, which forms a part of an unlocking mechanism, however, is increased through this and the comfort for operating the unlocking mechanism is impaired through this.

In addition, other objects, desirable features and characteristics will become apparent from the subsequent summary and detailed description, and the appended claims, taken in conjunction with the accompanying drawings and this background.

SUMMARY

According to various exemplary embodiments, provided is a support for a functional part in the form of a container, an armrest or the like in a pair of rails within a passenger compartment of a motor vehicle, which ensures that, in response to a loading of the functional element, axial forces are not introduced into the guide elements, which are inserted into the guide grooves, wherein it is to be ensured that the support can manage with relatively small spring forces for pretensioning the respective guide element into the assigned guide groove.

It is significant in the case of this support that the lower arm of the guide groove, which extends from the groove base of the respective guide groove, is arranged horizontally. Accordingly, the displacement axis of the guide element, which cooperates with this guide groove, is arranged diagonally to the horizontal.

By horizontally supporting the lower arm of the guide groove, a force component is not introduced into the axially displaceable, bolt-like guide element in axial direction thereof in response to a vertical load by the dead weight of the container, in one example, of the loading space container and/or of the armrest, and further the weight of stowed objects and the forces introduced into the armrest by supporting a person, whereby the system is self-locking. The frictional forces between guide element and guide groove are not reduced in terms of the displaceability of the functional element in the pair of rails and when the guide element additionally serves to lock with the rail, it may be impossible for an unlocking to take place by creating a force component in axial direction of the bolt-like guide element. With this design, the required spring forces for the actuation of the bolt-like guide elements or for the unlocking, respectively, as well as forces of springs, which can be provided within the guide elements for the purpose of tolerance compensation, can be reduced. The required application of force for actuating the guide elements is thus reduced. This leads to a comfort improvement for the operation of the adjustable armrest or of the adjustable container, respectively, in one example, loading space container.

The guide groove is designed so as to be generally simple with reference to structure and the self-locking system can be realized in a simple manner, when the guide groove encompasses a trapezoidal cross section and the projection of the guide element encompasses a cross section of which is designed in a correspondingly trapezoidal manner. Under the impact of the springs, the respective guide element, with its diverging areas of the section, which is designed in a trapezoidal manner, comes to rest against the diverging areas of the guide groove.

A locking of functional element and rail can be realized in a generally simple structural and functional manner, when at least one of the guide elements, in one example, one guide element on each side of the housing of the functional element, encompasses an extension pin, which extends beyond the projection in the area of its end, which faces the assigned guide groove, for inserting into a hole in the base of the guide groove. The extension pin can be inserted into the hole of the rail with a slight play in displacement direction of the functional element, and thus fixes the functional element in displacement direction of the rail with respect to the latter.

The projection and the extension pin in one example, form one component.

The guide groove of the guide rail thus has in one example, a basic conical shape. The basic conical shape, however, is embodied such that the lower arm in installation position is arranged horizontally. The imaginary center line of the symmetrical basic conical shape of the guide groove in the guide rail thus runs at a defined angle to the horizontal plane.

The guide elements encompass in one example, conical ends, which correspond to the basic conical shape of the guide groove in the rail. The conical ends of the guide elements glide along this conical contour in the groove of the rail. For a smooth displacement of the functional element, provision is to thus be made for a contact surface between guide element and groove of the rail, which is as small as possible. This is obtained by means of the conical contour of the ends of the guide elements.

The effective direction for disengaging or unlocking the functional elements, respectively, for displacing the functional element runs along the imaginary center line of the basic conical shape of the groove in the respective guide rail. The effective direction for the disengagement or unlocking, respectively, is thus arranged diagonally to the horizontal axis.

For the purpose of tolerance compensation, provision is made in the case of the system for a pressure spring to be arranged within the guide element, which is embodied in two parts. In one example, the respective guide element encompasses a first part, which encompasses the projection, and a second part, which is supported so as to be axially displaceable in the first part as well as so as to be displaceable in the housing of the guide element. The two parts are connected to one another by means of a latching connection with axial play and a pressure spring is effective between the two parts. In one example, the two parts are inserted into one another and form a cavity, wherein the pressure spring is arranged within the cavity. By introducing the spring into the guide element, assembly is simplified, because the spring is assembled with the guide element in a pre-operation and can be inserted into the housing of the functional element as a complete unit.

For axially displacing the respective guide element opposite to the force of the spring, provision is made, in one example, for the respective guide element to encompass a section, which is embodied as gear rod and which cooperates with a gear wheel section of a control lever, which is pivotably supported in the housing of the functional element, wherein the control lever can be pivoted by means of the actuator, which is supported in the housing. The guide element is moved inwardly in a straight line via the gear rod through the gear wheel section and the guide element is transferred from its disengaged position into the engaged position or from the locked position into the unlocked position, respectively. This mechanics for moving the guide element can be illustrated in a generally simple manner with regard to its structure due to the mentioned design.

In one example, the spring, which acts on the guide element, is a control spring, which engages with assigned control levers on two different sides of the housing of the functional element and which thus acts on functional elements, which are arranged on different sides of the housing.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 4 shows a section according to line A-A in FIGS. 1 and 2; and

FIG. 5 shows a three-dimensional view of the guide element illustrated in FIG. 4.

DETAILED DESCRIPTION

Figure 1:
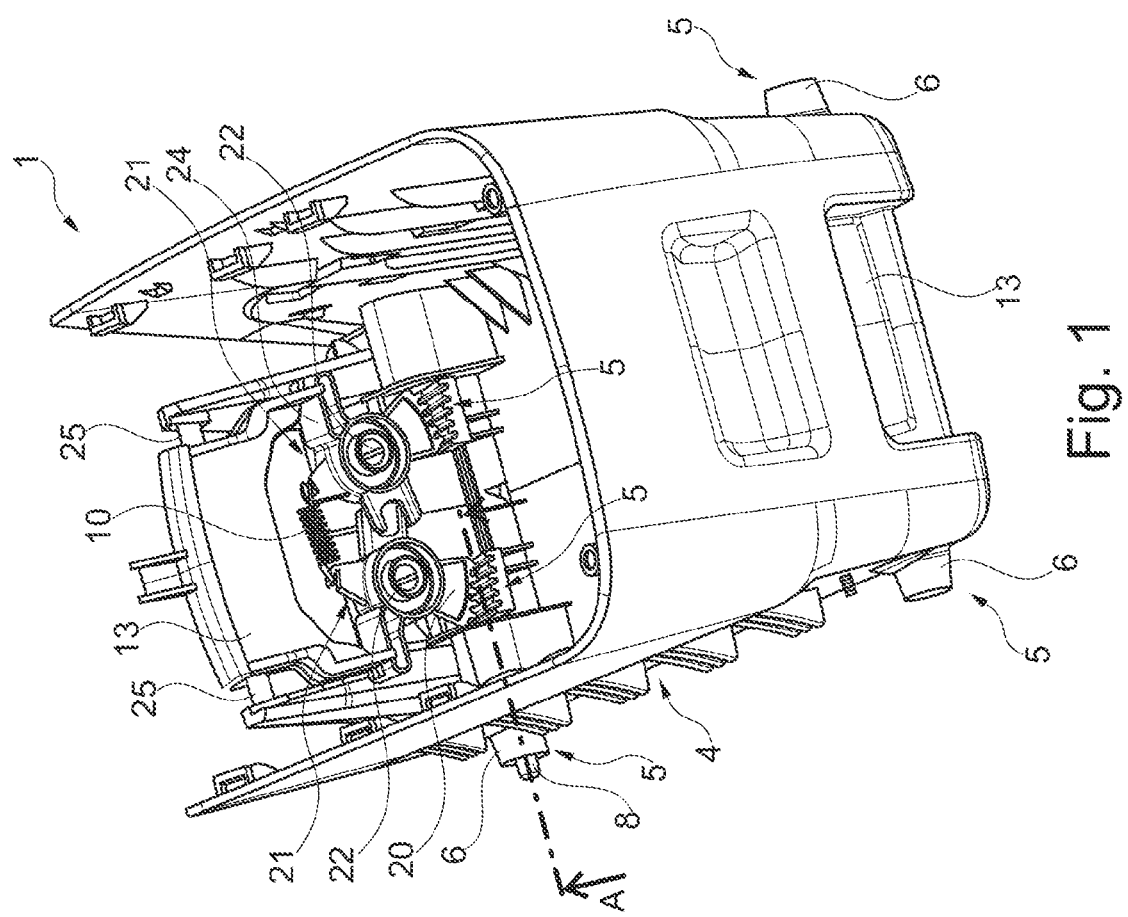
FIG. 1 shows the functional element embodied as loading space container, partially illustrated, viewed in a three-dimensional view diagonally from the rear, with an illustrated kinematics for locking and unlocking the two front guide elements.
Figure 2:
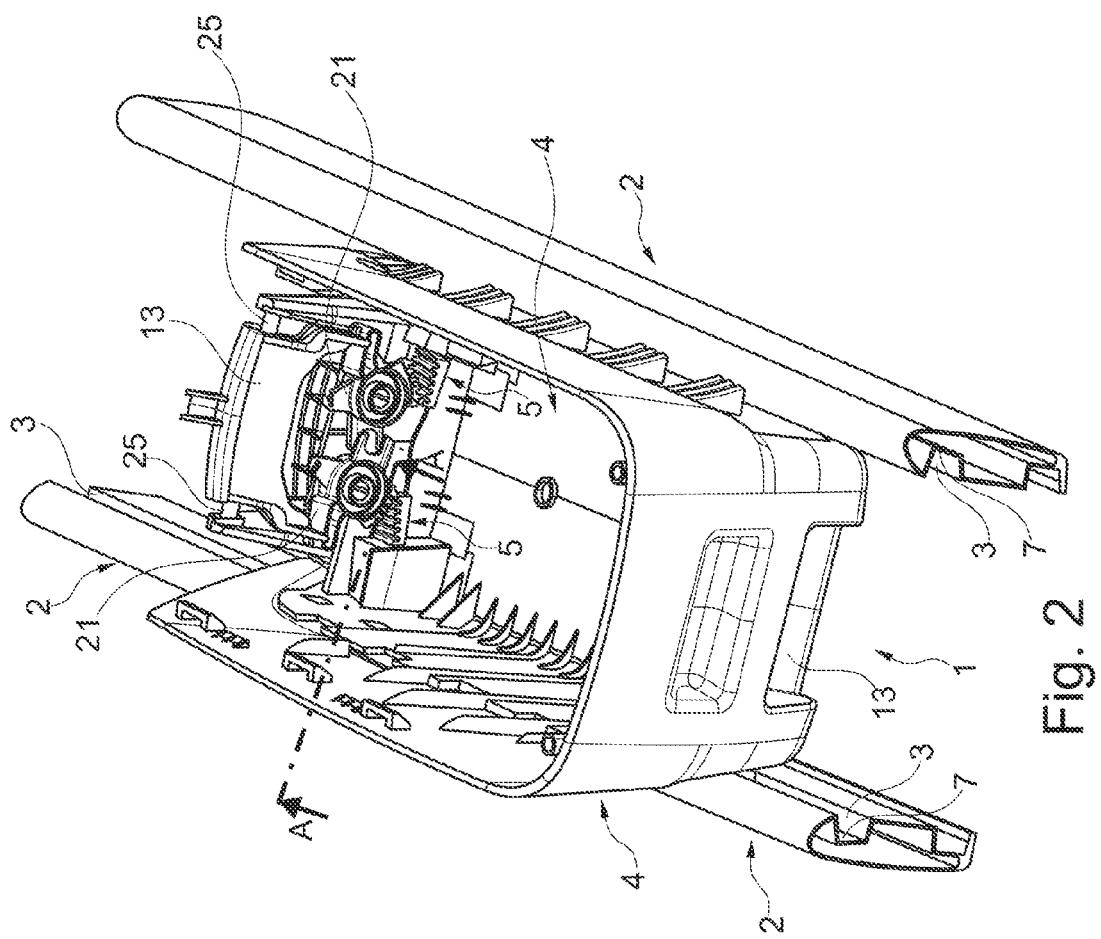
FIG. 2 shows the arrangement according to FIG. 1, but without illustrated spring for acting on the two front guide elements, in response to the support for the functional element in the pair of rails, illustrated in a three-dimensional view.
Figure 3:
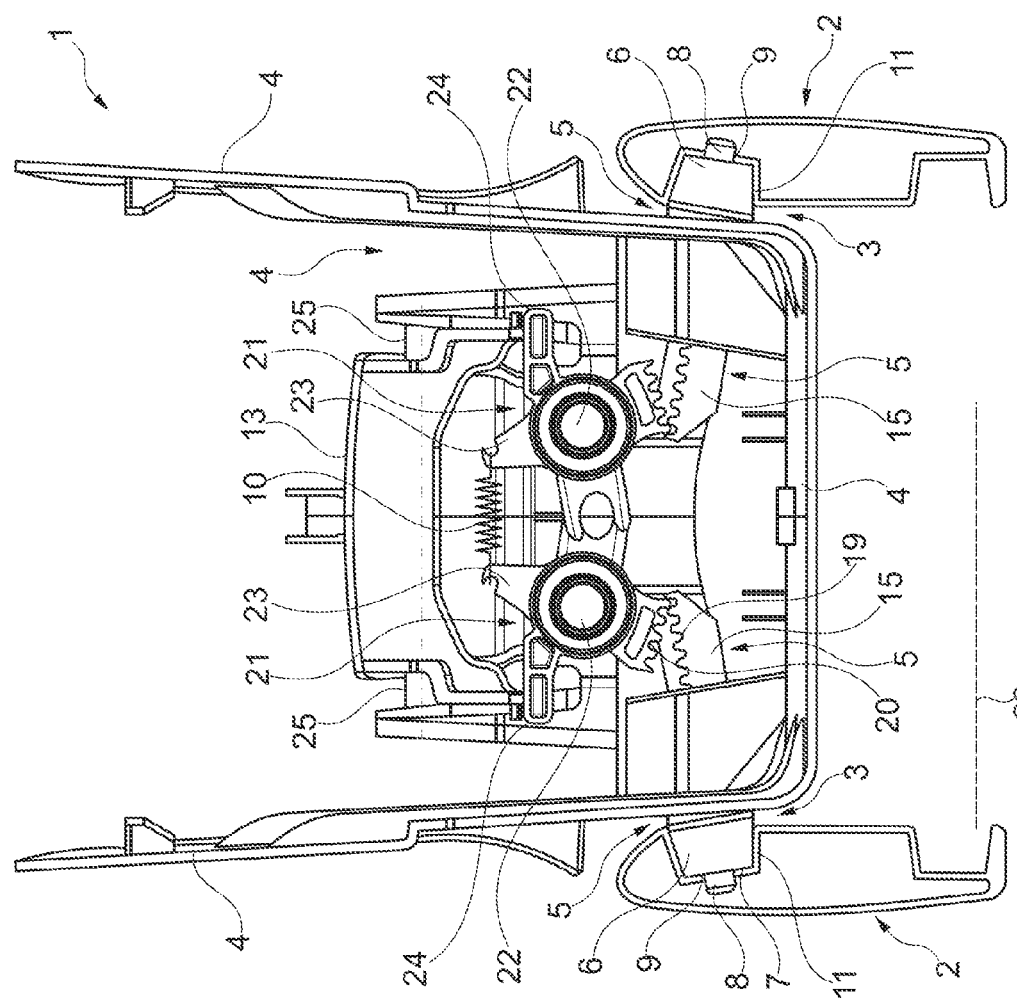
FIG. 3 shows a section through the arrangement according to FIG. 2, in a sectional view vertically to the forward driving direction of the motor vehicle, in which the arrangement is assembled.

The following detailed description is merely exemplary in nature and is not intended to limit the present disclosure or the application and uses of the present disclosure. Furthermore, there is no intention to be bound by any theory presented in the preceding background or the following detailed description.

The support for a functional element 1, which is embodied as a loading space container, in a pair of rails, which is formed by two rails 2, in an interior of a passenger vehicle is described in the figures. Extending from a front dashboard of the passenger vehicle, the pair of rails comprising the two rails 2, which are arranged substantially parallel at a distance to one another, and are arranged between the driver's seat and the front passenger's seat and extends up to the second row of seats, which is arranged behind this first row of seats of the vehicle. The pair of rails serves to displaceably accommodate the functional element 1 in longitudinal extension of the two rails 2, with the possibility of locking the functional element 1 with regard to the pair of rails. The displacement direction is hereby horizontal, parallel to the floor of the vehicle interior. In the area of each rail 2, the functional element 1 is guided in the front and the rear in the rail and can be connected thereto by means of a frictional connection, wherein provision is made in the area of the front guide, on each side of the functional element 1, for an additional lock for the functional element 1 with regard to the respective rail 2.

On sides facing one another, the two rails 2 in each case encompass a guide groove 3. Axially displaceable, bolt-like guide elements 5 comprising projections 6, which face this rail 2, are supported in a housing 4 of the functional element 1, which forms the actual container, in the front and on the rear side thereof, which faces the respective rail 2.

The respective guide groove 3 encompasses a cross section, which expands from the groove base 7. The respective projection 6 encompasses a cross section, which expands accordingly towards the housing 4 of the functional element 1. Concretely, the guide groove 3 encompasses a trapezoidal cross section and the projection 6 of the guide element 5 encompasses a section, which is designed in a trapezoidal manner, corresponding to the cross section. On each side of the housing 4, in the front area of the housing 4, the guide element 5 located there is provided with an expansion pin 8, which projects beyond the projection 6, in the area of its end, which faces the assigned guide groove 3. The projection 6 and the extension pin 8 form one component. In the area of the groove base 7, distributed across the length of the guide groove 3, the respective guide groove 3 encompasses diverse holes 9. In the case of an oriented arrangement of the functional element 1 with regard to the rail 2, in which the extension pin 8 is aligned with the hole 9, the extension pin 8 can be inserted into the hole under the impact of spring force, whereby the functional element 1 is locked with regard to the rail 2.

This spring, which acts on the guide element 3 and which pretensions the projection 6 thereof against the guide groove 3 in the area of its expanding cross section, is identified with reference numeral 10.

A lower arm 11 of the guide groove 3, which extends from the groove base 7 of the respective guide groove 3, is arranged horizontally and the displacement axis 12 of the guide element 5, which is assigned to this guide groove 3, is arranged accordingly diagonally to the horizontal 28.

By means of an actuator 13, which is supported in the housing 4 and which can be pivoted there about an axis 25, the two guide elements 5, which are arranged in the front area of the functional element 1 and which encompass the extension pins 8, can be transferred opposite to the force of the spring 10 into the disengaged position thereof, thus unlocked position, in which the extension pins 8 are moved out of the holes 9 in the two rails 2 and in which the projections 6 of the guide elements 5, which face the two rails 2, are furthermore completely moved into the housing 4. In the rear area of the functional element 1, however, only guide elements 5, which are only provided with the projections 6 and which thus do not encompass any extension pins 8, are arranged on both sides of the housing 4. By means of an actuator, which is not illustrated in detail, but which is in principle embodied according to the front actuator 13, these two rear guide elements 5 can also be transferred opposite to the force of a spring, which acts on the two rear guide elements, from the frictional connection into the non-frictional connection described for the front guide elements 5 with regard to the rail 2, in which they are completely moved into the housing 4. With regard to the kinematics of the rear guide elements, reference is made in this regard to the below description of the kinematics of the front guide elements 5.

The respective guide element 5 thus encompasses a first part 14, which is displaceably supported in the housing 4 of the functional element 1 and which encompasses the projection 6, and a second part 15, which is supported in the part 14 and which is displaceably supported in the housing 4 of the functional element 1. An extruded web 26 of the housing 4, which comprises plastic, which is arranged diagonally to the displacement direction of the functional element 1, hereby supports the guide element 5. For compensating tolerances, the two parts 14 and 15 are connected by means of a latching connection 16 with axial play and a pressure spring 17 is effective between the two parts 14 and 15. Inserted into one another, the two parts 14 and 15 form a cavity 18, in which the pressure spring 17 is arranged.

The respective guide element 5, in one example, the second part 15 thereof, encompasses a section 19, which is embodied as gear rod and which cooperates with a gear wheel section 20 of a control lever 21, which is supported in the housing 4 of the functional element 1 so as to be capable of being pivoted about an axis 22. The control lever 21, which is axially fixed by means of a fixing pin 27, encompasses a further section 23 for connecting the spring 10 and a further section 24 for contacting by means of the pivotable actuator 13. To actuate each front pair of guide elements 5, provision is thus made for two control levers 21. Likewise, provision is made for two control levers for actuating the rear pair of guide elements 5. Each front or rear pair of control levers, respectively, can be pivoted opposite the force of the spring 10, in terms of the disengagement movement of the respective guide element 5, wherein the spring 10 engages with the control lever 21 at a distance to the respective axis 22.

The described support for the functional element 1 in the pair of rails in the passenger vehicle represents a robust system for the rails 2 and guide elements 5, which glide therein, for individually adjusting or positioning, respectively, the functional element 1 along the rails 2. The horizontal position of the respective lower arm 11 of the guide groove 3 ensures that a force component is not introduced in effective direction for disengaging or unlocking, respectively, the guide elements 5 with regard to the rail 2 in response to the introduction of a vertical load into the rail 2 by means of the functional element 1. The system is thus self-locking. The required spring forces for the actuation of the unlocking at the control lever 21 as well as the spring forces within the guide elements 5 for the tolerance compensation by means of the additional pressure spring 17 can thus be reduced through this. The required expenditure of force for actuating the unlocking mechanism is reduced through this. This leads to a comfort improvement for the operation of the adjustable functional element 1. To unlock the guide elements 5 or to override the frictional connection of guide elements 5 and rails 2, respectively, the guide element 1 is seized at the front and rear in the area of recessed grips of the actuators 13 and the functional element 1 can then be displaced in longitudinal direction of the rails 2 or can be removed therefrom, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A support for a functional element, comprising:
a pair of rails that each include guide grooves on a side and the guide grooves of the pair of rails face one another, with each guide groove having a cross section, which expands from a groove base;
a plurality of axially displaceable, bolt-like guide elements that are supported in a housing of the functional element and extend from a side of the housing, the plurality of guide elements each including a projection, which faces a respective one of the pair of rails, each projection having a cross section, which expands towards the housing of the functional element; and
a spring that acts on the plurality of guide elements and pretensions the projection of the respective one of the plurality of guide elements against a respective one of the guide grooves, and the plurality of guide elements are movable by means of an actuator supported in the housing opposite to the force of the spring from the contact position in the guide groove,
wherein a lower arm of a respective one of the guide grooves, which extends from the groove base of the respective one of the guide grooves, is arranged horizontally and the displacement axis of the respective one of the plurality of guide elements for the respective one of the guide grooves is arranged diagonally to the horizontal.

2. The support according to claim 1, wherein each guide groove encompasses a trapezoidal cross section and each projection of the plurality of guide elements encompasses a cross section that is designed in a correspondingly trapezoidal manner.

3. The support according to claim 1, wherein at least one of the plurality of guide elements on each side of the housing of the functional element includes an extension pin, which extends beyond the projection in the area of its end, and faces a respective one of the guide grooves and is insertable into a hole in the groove base of a respective one of the guide groove.

4. The support according to claim 3, wherein the projection and the extension pin form one component.

5. The support according to claim 1, wherein each of the plurality of guide elements further comprises a first part, which encompasses the projection, and a second part, which is supported so as to be axially displaceable in the first part as well as so as to be displaceable in the housing of the functional element, wherein the two parts are connected to one another by means of a latching connection with axial play and a pressure spring is effective between the two parts.

6. The support according to claim 5, wherein the two parts are inserted into one another and form a cavity, wherein the pressure spring is arranged within the cavity.

7. The support according to claim 1, wherein each of the plurality of guide elements further comprises a gear rod that cooperates with a gear wheel section of a control lever, and is pivotably supported in the housing of the functional element, with the control lever pivotable by means of the actuator, which is supported in the housing.

8. The support according to claim 1, wherein the spring, which acts on the plurality of guide elements, is a control spring, which engages the control levers, which are assigned to two, different sides of the housing of the functional element.

9. The support according to claim 1, wherein the functional element is at least one of a container and an armrest.

10. A motor vehicle, comprising:
a functional element having a housing;
a pair of rails that each include guide grooves on one side and the guide grooves of the pair of rails face one another when the pair of rails are coupled to the motor vehicle, with each guide groove having a cross section that expands from a groove base;
a plurality of axially displaceable, bolt-like guide elements that are supported in the housing of the functional element and extend from a side of the housing, the plurality of guide elements each including a projection, which faces a respective one of the pair of rails, each projection having a cross section, which expands towards the housing of the functional element; and
a spring that acts on the plurality of guide elements and pretensions the projection of the respective one of the plurality of guide elements against a respective one of the guide grooves, and the plurality of guide elements are movable by means of an actuator supported in the housing opposite to the force of the spring from the contact position in the guide groove,
wherein a lower arm of a respective one of the guide grooves, which extends from the groove base of the respective one of the guide grooves, is arranged horizontally and the displacement axis of the respective one of the plurality of guide elements for the respective one of the guide grooves is arranged diagonally to the horizontal.

* * * * *